FIG. 1.

Oct. 4, 1955  H. NERWIN  2,719,454
PARALLAX MECHANISM FOR PHOTOGRAPHIC CAMERA
Filed May 17, 1952  6 Sheets-Sheet 2

INVENTOR.
HUBERT NERWIN
BY
ATTORNEY

Oct. 4, 1955 H. NERWIN 2,719,454
PARALLAX MECHANISM FOR PHOTOGRAPHIC CAMERA
Filed May 17, 1952 6 Sheets-Sheet 3

INVENTOR.
HUBERT NERWIN
BY
ATTORNEY

Oct. 4, 1955  H. NERWIN  2,719,454
PARALLAX MECHANISM FOR PHOTOGRAPHIC CAMERA
Filed May 17, 1952  6 Sheets-Sheet 4

INVENTOR.
HUBERT NERWIN

BY

ATTORNEY

United States Patent Office 2,719,454
Patented Oct. 4, 1955

2,719,454

PARALLAX MECHANISM FOR PHOTOGRAPHIC CAMERA

Hubert Nerwin, Irondequoit, N. Y., assignor to Graflex, Inc., Rochester, N. Y., a corporation of Delaware Application May 17, 1952, Serial No. 288,511

6 Claims. (Cl. 88—1.5)

The present invention relates to photographic cameras and more particularly to a mechanism for use in photographic cameras for correcting for parallax and change of field of view. In a still more specific aspect the invention relates to a mechanism for parallax and change of field of view correction which is adapted to be used with any one of a number of different, interchangeable photographic objective lenses.

For objective lenses of different focal lengths, the parallax correction is the same but different corrections are required at the viewfinder or eyepiece of the camera for the change of field of view. Furthermore, when each objective lens mount is adjusted in focusing, the parallax mechanism of the camera should be actuated simultaneously to shift the position of the image area, in correspondence to the focusing adjustment of the lens. An additional adjustment of the image area appearing in the viewfinder or eyepiece of the camera should also be made to effect change of field of view correction in correspondence to the change in position of the objective lens due to focusing adjustment of its mount. The change of field of view correction desirable to compensate for focusing adjustment varies with objective lenses of different focal lengths.

The situation, as respects use of different objective lenses with a given camera, is further complicated by the fact that the size of the image area appearing in the viewfinder or eyepiece of the camera should be varied to correspond to the picture angle or focal length of the selected objective attached to the camera.

Heretofore no practical mechanism has been devised that will effect all the corrections desired for each objective lens mount and for the different objective lens mounts that may be used with a camera. Such correcting mechanisms as have heretofore been proposed have been too complicated or too costly to prove practical. As a result cameras are conventionally made with correction for parallax, or correction for size of image area, but without both.

Furthermore, even where the camera has been provided only with parallax-correcting means, it has heretofore been necessary to use a different control cam for each different objective lens mount used with the camera to effect the required parallax correction for each different mount.

One object of the present invention is to provide a camera with means for automatically positioning the image area appearing in the viewfinder for eyepiece of the camera, in accordance with the particular objective lens mount being used on the camera, when attaching each lens mount to the camera, thereby to correct automatically for the parallax of that mount at zero position of its focal adjustment.

Another object of the invention is to provide a camera with means for automatically modifying the position of the image area appearing in the viewfinder or eyepiece of the camera as an objective lens mount used with the camera is adjusted in focusing, and for automatically modifying the position of image area and in the proper proportion during focusing of any objective lens mount used on the camera.

Another object of the invention is to provide parallax-correcting means of the character described which may be actuated by an objective lens mount when the mount is secured in operative position on the camera and which is actuated by all the objective lens mounts used on the camera when each lens mount is adjusted for focusing.

Another object of the invention is to provide a parallax-correcting means of the character described which is operable with all the different objective lens mounts that may be used on the camera and which is actuated during focusing adjustment of each lens mount by a single cam to which each objective lens mount is coupled automatically when the lens mount is attached to the camera.

Another object of the invention is to provide a camera having means for automatically adjusting the size and position of the image area appearing in the viewfinder or eyepiece of the camera to correspond to the focal length of the selected photographic objective when the latter is attached to the camera, thereby simultaneously to correct for parallax and the differences in the change of field of view of different photographic objectives and to make the size of the image area correspond to the selected photographic objective used.

A further object of the invention is to provide a camera having mechanism for automatically adjusting the size and position of the image area, appearing in the viewfinder or eyepiece of the camera, as the photographic objective mount is secured in operative position on the camera.

A further objective of the invention is to provide a camera having means for automatically adjusting the size and position of the image area appearing in the viewfinder or eyepiece of the camera as a selected photographic objective is adjusted for focusing.

Still another object of the invention is to provide a camera having a control means that is automatically positioned, when a selected photographic objective lens mount is attached to the camera, thereafter to control movement of the image-area framing means of the camera under control of a second means that is adjustable on focusing, thereby to effect the required parallax and change of field of view correction during focusing of the selected photographic objective mount that is attached to the camera.

A still further object of the invention is to provide a camera having a parallax correcting mechanism, that is adjustable on focusing adjustment of each photographic objective lens mount used on the camera, and also having a control means that is adjusted, when the selected photographic objective lens mount is attached to the camera, both to position the image-area framing means in accordance with the size of the image area which is suitable for that particular objective lens mount, and to provide for suitable variation in the image area, in accordance with the focal length of the selected objective lens mount attached to the camera, as the selected lens mount is adjusted during focusing.

Other objects of the invention will be apparent hereinafter from the specification and from the recital of the appended claims.

In the drawings:

Fig. 12 is a fragmentary rear view, with parts further broken away, showing the base of the parallax mechanism, the parallax slide, and the cam and lever for operating the same;

Fig. 13 is a fragmentary section, such as might be taken on the line 13—13 of Fig. 9 looking in the direction of the arrows;

Fig. 14 is a plan view; and Fig. 15 is a side elevation, with parts broken away of the hook of the parallax mechanism;

Fig. 16 is a plan view of the guide on a scale of approximately twice that of Fig. 14 and showing also fragmentarily the two masks actuated thereby;

Fig. 17 is a side elevation of the parts shown in Fig. 16; and

Figures 3, 4, 5:
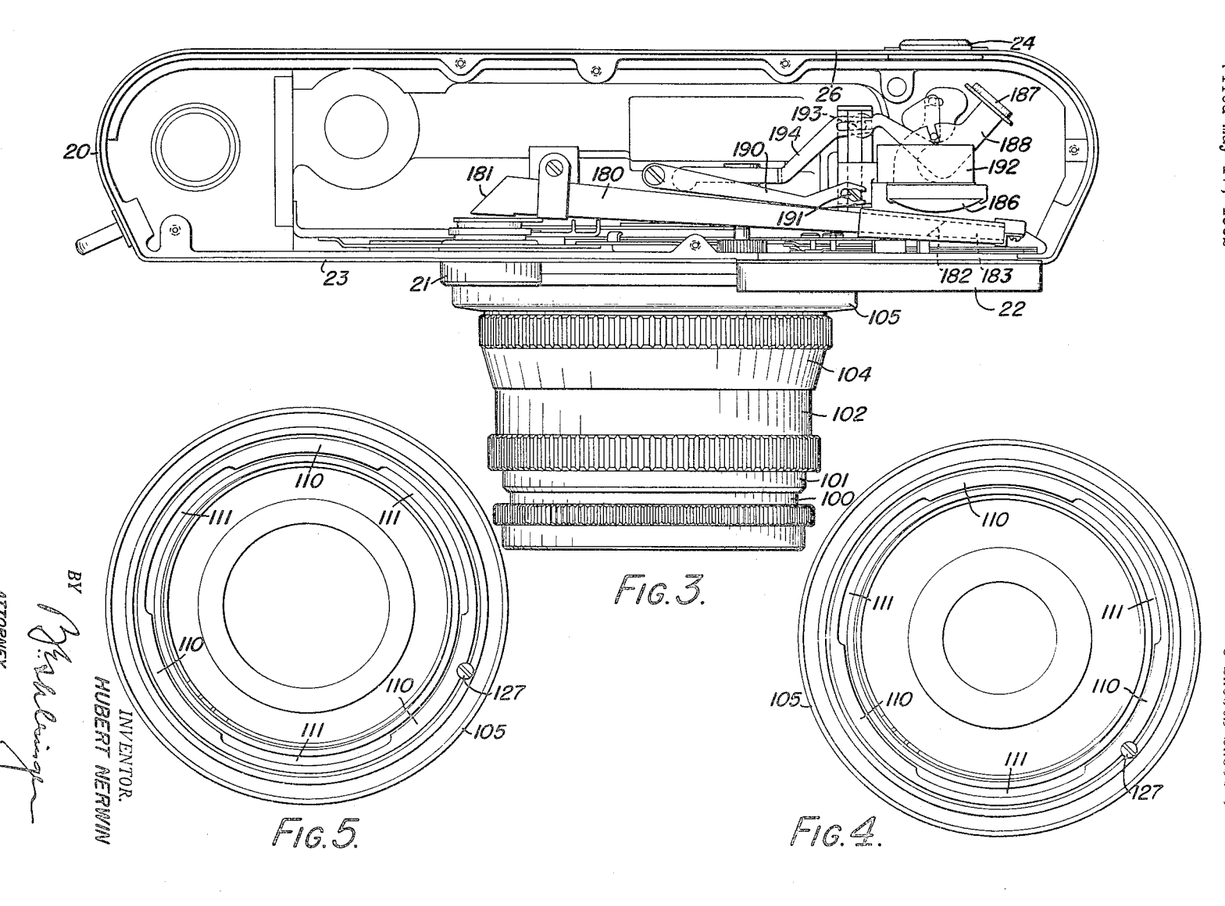
Fig. 3 is a longitudinal section through the camera, showing an objective lens mount secured to the front of the camera and showing details of the optical system of one type of rangefinder that may be used with the camera.
Figs. 4 and 5 are rear views of different objective focusing mounts that can be used on the camera.

Referring now to the drawings by numerals of reference 20 denotes the casing of the camera (Fig. 3). This camera has a built-in rangefinder which may be constructed as described in my pending U. S. patent application Serial No. 318,231, filed November 1, 1952. To this end, the casing 20 of the camera has window openings 21 and 22 (Fig. 1) in its front wall 23 through which the subject, that is to be photographed, is viewed in the rangefinder. Window 22 also serves as a window through which the subject may be viewed in the viewfinder or eyepiece 24 of the camera. Eyepiece 24 is mounted in the rear wall 26 of the camera casing in axial alignment with window 22. The camera casing has also an opening 25 in its front wall 23 to receive the objective lens mount that is used with the camera.

Mounted in the casing 20 directly behind the window 22 is the parallax mechanism of the camera. This includes a base 30 (Figs. 2 and 12), which is secured to the inside wall of the front plate 23 of the camera by screws 31 which engage in slots 32 in the base. The base constitutes part of the image area framing mechanism of the camera and has a rectangular opening 35 therethrough, indicated in dotted lines in Fig. 12.

Figures 12, 13, 14, 15, 16, 17:
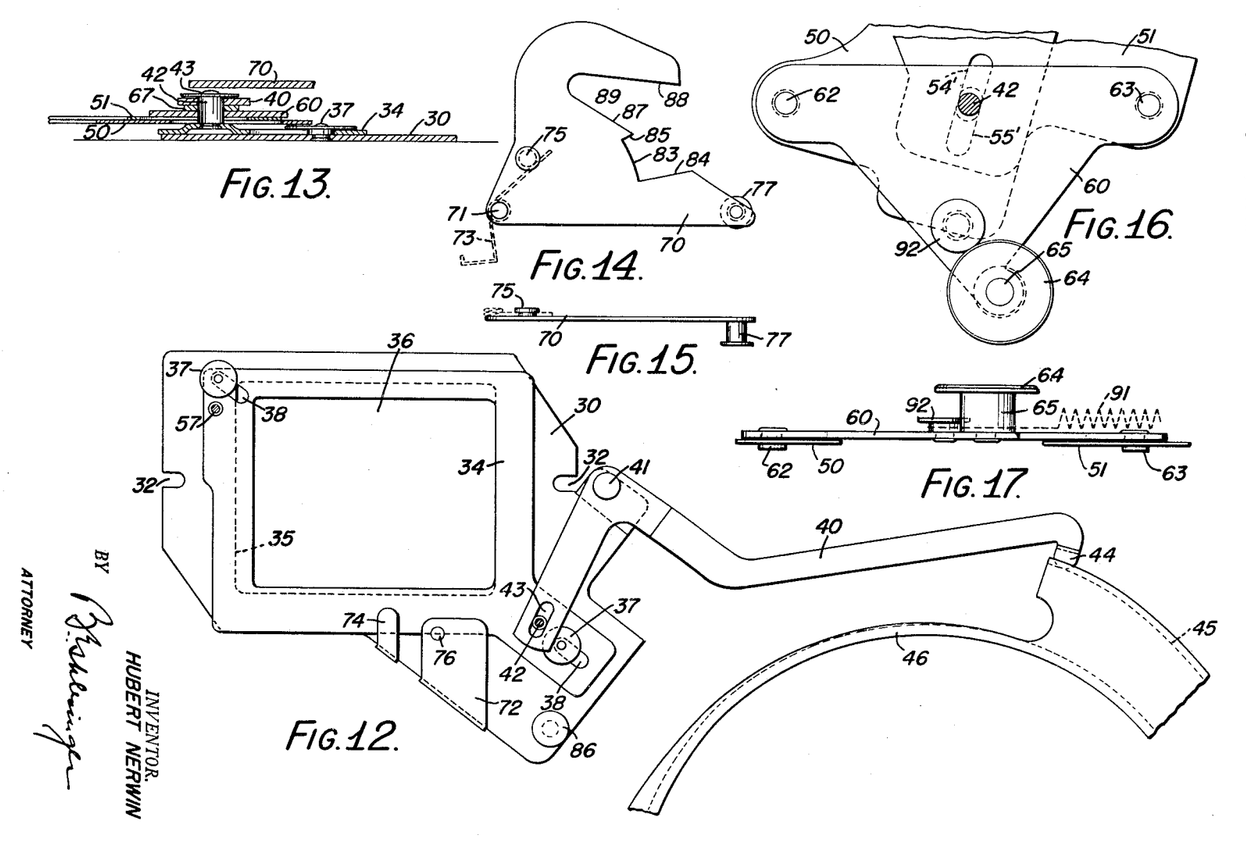
Figure 18:
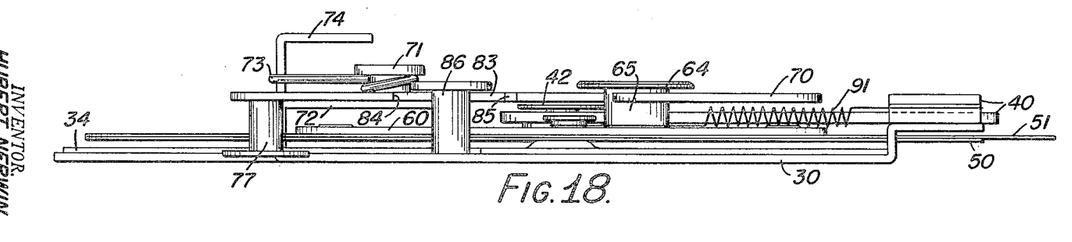
Fig. 18 is a fragmentary elevation of the parallax mechanism including the base, the parallax slide, the upper and lower masks, the operating lever, and the hook, showing how these parts are connected together and looking in the direction of the arrow A in Fig. 10.

Mounted to slide on the base 30 is a parallax slide 34. The parallax slide 34 constitutes a further part of the image area framing mechanism of the camera and has a rectangular opening 36 therethrough that registers with opening 35 in base 30. The slide 34 is mounted to slide on the base 30 in a direction diagonal of the two openings 35 and 36, being guided in its movement by headed studs 37 which are riveted to the base and whose stem portions pass through slots 38 in the slide. The heads of these studs serve to retain the slide on the base.

The slide is adapted to be actuated by a bell-crank lever 40 (Figs. 2, 9, 10, 12 and 13) which is pivotally mounted intermediate its ends by means of a stud 41 on the base 30. This lever is connected to the slide 34 by means of a stud 42 that is riveted in the slide and that engages in a slot 43 formed in one arm of the lever. The lever 40 is formed at its opposite end with a follower 44 that engages in the track 45 of a rotary cam 46 which is journaled in the housing 20 in the opening 25 thereof. This cam is adapted to be coupled, as will be described further hereinafter, to each objective focusing mount used on the camera so that as a mount is adjusted in focusing the cam will be rotated to effect through the lever 40 movement of the parallax slide 34 on the base 30.

Mounted on the parallax slide is a lower mask 50; and mounted upon the lower mask 50 is an upper mask 51 (Figs. 9, 10, 11, 13 and 18). The lower mask 50 is generally U-shaped and bounds a rectangular opening such as indicated at 52 in Fig. 11. The upper mask 51 is generally rectangular in shape and has a central rectangular opening 53 therethrough. The masks 50 and 51 constitute further parts of the image area framing mechanism of the camera; and the openings therein register with the openings 35 and 36 in base 30 and parallax slide 34, respectively.

The masks 50 and 51 are secured to the parallax slide 34 and guided thereon by a headed stud 57 (Figs. 9 and 12) and by the headed stud 42. Stud 57 is riveted to the parallax slide 34. It engages in aligned slots 54 and 55 in the upper left hand corners (Fig. 11) of the two masks. The stud 42 engages in aligned slots 54' and 55' in the lower right hand corners of the two masks. Slots 54, 55, 54', 55' extend diagonally of the openings 52 and 53 in the two masks.

The two masks are adapted to be shifted relative to one another to vary the size of the image area seen in the viewfinder or eyepiece in accordance with the focal length of the objective focusing mount used on the camera. They are also shiftable as each objective focusing mount, except one (preferably the one for the shortest focal length lens), is adjusted in focusing. Movement of the masks 50 and 51 relative to one another is effected by a guide 60 (Figs. 9, 10, 11, 16 and 17). This guide is pivotally connected to the lower mask 50 by a stud 62. It is pivotally connected to the upper mask 51 by a stud 63. It is connected to lever 40 by the headed stud 42, being separated from lever arm 40 by a washer 67 (Fig. 13). It carries a headed stud 64 which has a shank 65.

The guide 60 is adapted to be rocked about its pivot 42 by a hook member 70 (Figs. 9, 10, 14, 15 and 18) which is pivoted by means of a stud 71 on the base 30. This stud is secured in a tab portion 72 that is integral with the base at one lateral edge thereof and that extends over the base parallel to the base. The pivot 71 for the hook member 70 is secured in the hole 76 (Fig. 12) in this tab. A spring 73, that is connected at one end to a second tab 74 formed on base 30, and that is wound around the pivot 71 and that engages at its other end with a stud 75 which is riveted to the hook member 70, serves to constantly urge the hook member 70 counterclockwise, as viewed in Figs. 9 and 10, about its pivot 71.

Figure 2:
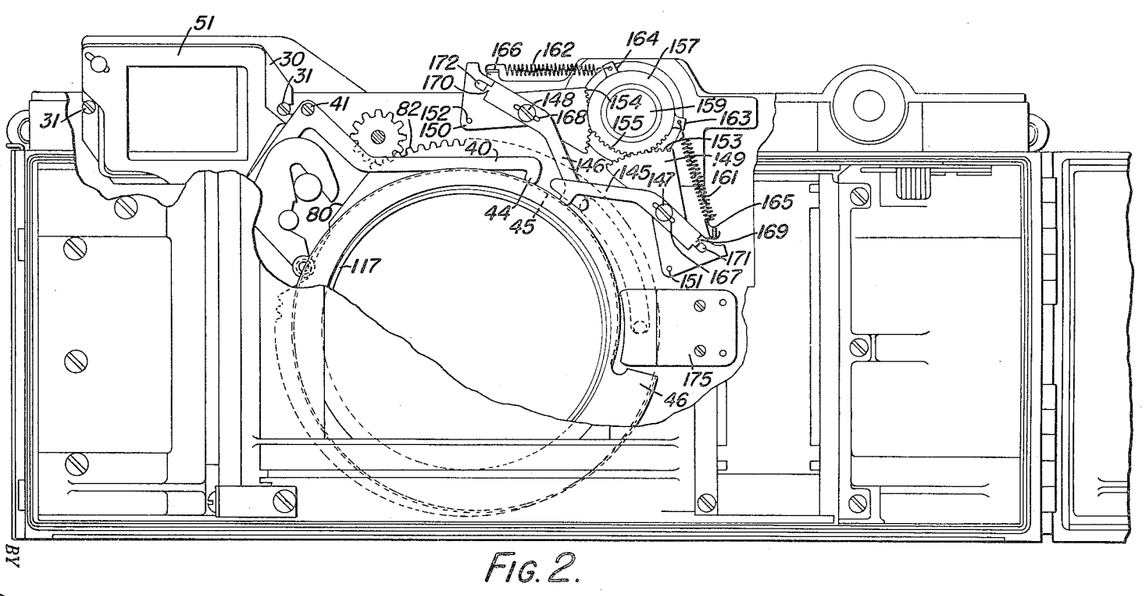
Fig. 2 is a rear elevation of this camera with the door shown fragmentarily and open, and with parts of the camera broken away to show the deflecting mechanism of the rangefinder, the frames which control the size and position of image area appearing in the viewfinder or eyepiece of the camera, and the cams which control the frames and the deflecting mechanism.
Figures 6, 7, 9:
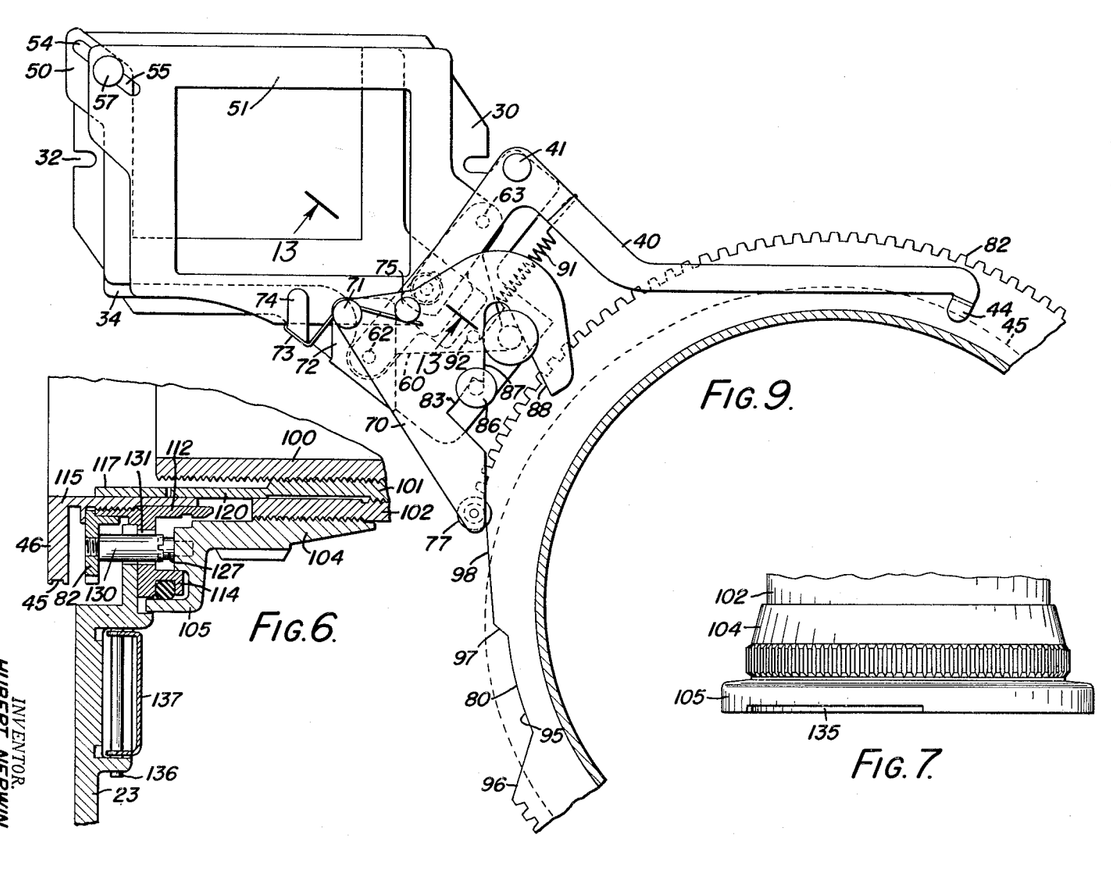
Fig. 6 is a fragmentary axial section of one of the photographic objective focusing mounts usable with the camera and showing how this mount is coupled to the cam which controls the parallax mechanism and to the cam which controls the size of the image area.
Fig. 7 is a fragmentary side elevation of the objective focusing mount, on a somewhat reduced scale as compared with Fig. 6, and illustrating the means for limiting the locking movement of the objective focusing mount in coupling the mount to the camera.
Fig. 9 is a fragmentary view on an enlarged scale looking from the rear of the camera, showing the image masks and parallax frame and the means for controlling the size and position of the image area that is seen in the viewfinder or eyepiece of the camera.
Figures 8, 10, 11:
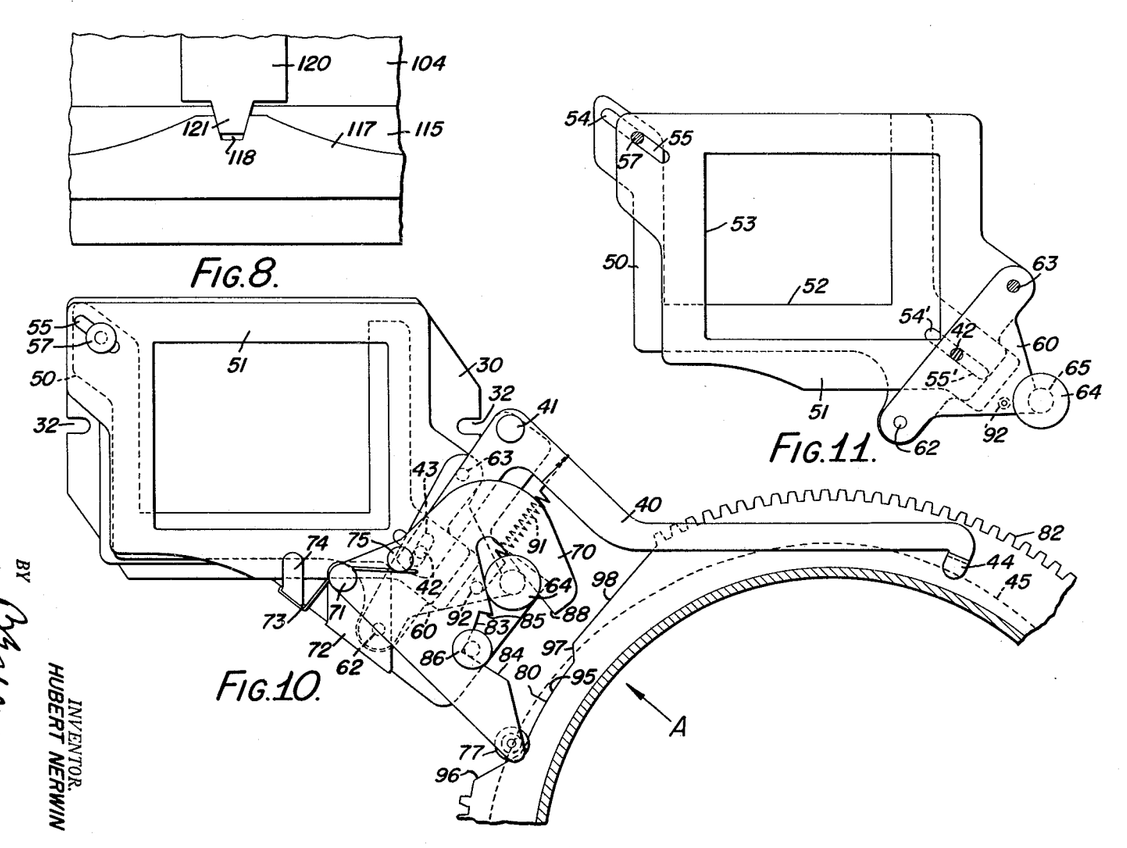
Fig. 8 is a fragmentary view looking at the inside of the barrel of the objective focusing mount and of the cam which controls the parallax mechanism and showing the means for coupling the objective focusing mount to this cam.
Fig. 10 is a fragmentary view, similar to Fig. 8, but showing the parts thereof in a different position.
Fig. 11 is a fragmentary rear elevation further showing the structure of the two frames which define the area of image and the guide which operates the same.

The hook member carries a roller or follower 77 which is adapted to engage with a cam track 80 that is formed part way around the periphery of an interrupted gear 82 (Figs. 2, 9 and 10).

The hook member 70 is formed with an arcuate surface 83 (Figs. 10 and 14) concentric to pivot 71 and defined by two substantially radial walls 84 and 85. A headed stud 86 (Figs. 9 and 10) which is secured in the base 30, has its shank portion riding on the arcuate surface 83. This stud is adapted to engage the walls 84 and 85 to limit the swinging movement of the hook member 70. The hook member is also formed with two converging surfaces 87 and 88 which together bound a recess 89. A coil spring 91, which is fastened at one end to the stud 92, that is riveted in the guide 60, and which is hooked at its other end over the lever 40 serves to constantly urge the guide 60 about its pivot and to constantly urge the shank 65 of the headed stud 64 toward engagement with the guide or cam surface 88 of the hook 70.

The gear 82 is mounted in the opening 25 in the camera casing coaxial with the cam 45 (Figs. 2 and 6). The cam surface 80 (Figs. 9 and 10) of the gear has a dwell portion 95 concentric with the axis of the gear, an inclined portion 96 at one end of the dwell portion joining the dwell portion with the toothed portion of the gear, a steeply inclined portion 97 at the opposite end of the dwell portion 95 and oppositely inclined to the portion 96, and a more moderately inclined portion 98 joining the steeply inclined portion 97 with the toothed portion of the gear.

Objective focusing mounts used with a camera constructed according to the present invention may be of standard construction so far as the lens systems of the objective focusing mounts are concerned. Suffice it to say that the lens system of each objective mount is carried in a barrel 100 (Figs. 3 and 6) that is mounted in a sleeve 101 which threads externally on the barrel and which threads internally into a sleeve 102. Sleeve 102 is provided for adjustment of the objective focusing mount in the factory. It may be fixedly secured to the sleeve 100 after adjustment. The front end of the sleeve 101 may be beveled off in conventional manner and graduated to read against an index mark or graduation on the periphery of the barrel 100. Threaded on the sleeve 102 but fixedly secured thereto is the adjusting sleeve 104.

As previously stated, objective focusing mounts of different focal lengths may be used on the camera, as, for instance, mounts for wide angle, normal angle, and telescopic lenses. Each objective focusing mount is coupled to the camera by a bayonet lock. Each objective focusing mount is also drivingly connected to the control cam 46. The manner of coupling an objective focusing mount to the camera and to cam 46 is shown in Figs. 4, 5, 6 and 8 together with Fig. 1.

The sleeve member 104 of each objective focusing mount is formed with a ring portion 105 (Figs. 3, 4, 5 and 6) that is provided with three equi-angularly spaced lugs 110 that project radially inwardly. These are separated from one another by the three arcuate recesses 111. The alternate lugs and recesses 110, 111 form one part of the bayonet lock joint whereby the objective focusing mount may be removably secured to the camera casing.

Figure 1:
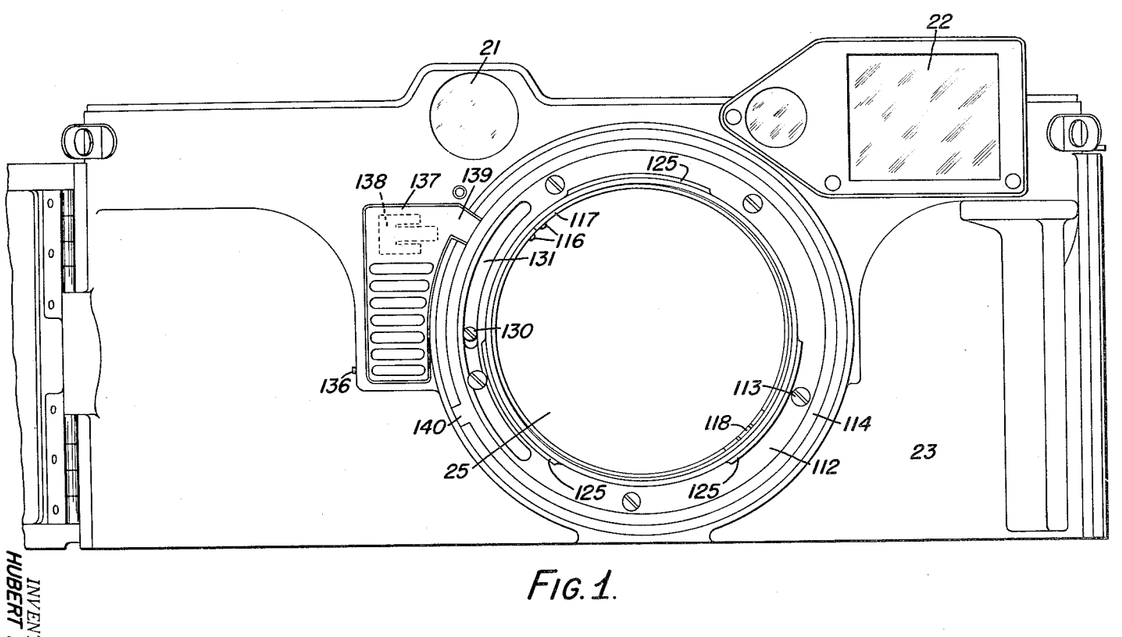
Fig. 1 is a front elevation of a camera constructed according to one embodiment of the present invention, the door at the rear of the camera being shown fragmentarily, also, and open.

The front 23 of the camera casing has as previously stated a circular opening 25 therein (Fig. 1). Surrounding this opening is a collar 112. This collar is secured to the camera casing by screws 113. It has a peripheral flange or rib 114. Rotatably mounted in the collar 112 and threaded into it is the sleeve portion 115 of the control cam 46. The sleeve portion 115 has riveted to it at its inside, as denoted at 116 (Fig. 1), a spring ring 117 which is provided at a point diametrically opposite the rivets with a recess 118 (Fig. 8).

Formed integral with the sleeve 101 and projecting rearwardly therefrom is a dog or lug 120 (Figs. 6 and 8). The recess 118 of the ring 117 is adapted to receive the finger 121 of the dog or lug 120 so as to couple the sleeve 101 of each objective focusing mount to the control cam 46 so that the control cam 46 may be rotated upon focusing adjustment of the objective focusing mount.

Integral with the collar 112 are three equi-angularly spaced lugs 125 (Fig. 1). These form the other part of the bayonet lock by which an objective focusing mount may be coupled to the camera.

Mounted in the rear face of the objective sleeve 104 of each objective focusing mount, except for one (preferably the one for the shortest focal length lens), is a pin 127 (Fig. 4). The pin 127 in each different objective focusing mount, except for the one, is located at a different angular position about the axis of the objective focusing mount, as will be seen by comparison of Figs. 4 and 5 which show two different objective focusing mounts, as, for instance, mounts for normal angle and for telescopic lenses.

The pins 127 are adapted to engage a pin 130 (Fig. 6) which is secured to the gear 82. This gear is rotatably mounted upon the collar 112. The pins 127 and 130 extend through an arcuate slot 131 (Fig. 1) in the collar 112 to engage one another (Fig. 6).

The pins 127 of the different objective focusing mounts, which have pins 127, are, as stated, arranged in different angular positions around the axes of their respective mounts so that, when rotating these different objective focusing mounts to couple them by means of the bayonet lock connection to the camera housing, the different mounts will be rotated different amounts before their respective pins 127 engage pin 130. Hence, in coupling different objective focusing mounts as, for instance, wide angle, normal angle, and telescopic lens focusing mounts, to the camera, the gear 82 and its cam surfaces 80 will be rotated not at all, for the wide angle focusing mount, for instance, and different amounts, respectively, for the other focusing mounts, thereby rocking the hook member 70 about its pivot 71, not at all for the wide angle mount, and different amounts for the normal angle and telescopic mounts, respectively.

Fig. 10 shows the gear 80 in its zero position which is the position it occupies when either the wide angle focusing mount is attached to the camera or there is no focusing objective mount attached to the camera. Here the hook 70 is rocked on its pivot 71 to one limit position against stop pin 86.

In coupling a wide angle objective mount to the camera no motion will be transmitted to the gear 80 because this objective focusing mount carries no pin 127. Hence, the hook member 70 will be held in the position shown in Fig. 10. The hook 70 is rocked counterclockwise about pivot 71 by spring 73, but the spring 91 holds the shank 65 of stud 64 in engagement with guide surface 88. Studs 57 and 42 bottom in the lower (right hand) ends of slots 55 and 55', respectively, and movement of the guide 60 under actuation of spring 91 counterclockwise beyond the position of Fig. 10 is prevented. As the wide angle objective mount is adjusted in focusing, however, cam 46 will be rotated. This will cause the long arm of lever 40 to be rocked upwardly about pivot 41. As lever arm 40 moves it shifts parallax slide 34 diagonally downwardly on base 30, thus shifting the position of the image area in the viewfinder or eyepiece toward the axis of the cam 46 and of the objective lens focusing mount. Since in the position shown in Fig. 10 the surface 88 of the hook member 70 is slightly inclined to the moving direction of the masks 50 and 51, a slight movement will be imparted to guide 60 and masks 50 and 51 during focusing adjustment of the wide angle objective mount. This movement, therefore, not only changes the position of the image area but at the same time slightly modifies the size of the image area. The size and position of the image area is corrected, therefore, during focusing to correct for parallax and in accordance with the adjusted focal length of the adjusted objective mount.

Cam 46 is designed for use with preferably the shortest focal length lens that is to be used on the camera, say a wide angle lens. Hence the movement which it imparts during focusing adjustment of the wide angle lens mount will impart to parallax slide 34 the movement required to vary the size and position of the image area appearing in the viewfinder or eyepiece in correspondence to the change in position of the lens in focusing.

When a normal angle lens is being attached to the camera by the bayonet lock, the gear 82 will be rotated by engagement of the pin 127 (Fig. 4) with the pin 130 (Fig. 6), the amount of such rotation being determined by the position of pin 127 in the objective mount. In this rotation, the roller 77 may ride, for instance, along the dwell 95 (Fig. 10) in the cam portion 80 of the gear and up onto the rise 97 of that cam portion. This will cause the hook member 70 to be rocked about pivot 71 and will change the angular position of surface 88 (Figs. 10 and 14) of the hook member. This will rock guide 60 and will cause the masks 50 and 51 to be shifted relative to one another to establish the initial size of the area of the image to conform to that required for the normal angle lens. Furthermore, since the guide surface 87 of the hook member is now more inclined to a line radial of the axis of cam 46 in the so-shifted position of the hook member 70, as the lever 40 rocks on its axis 41 on rotation of cam 46 during focusing adjustment of the normal angle objective lens mount, the masks 50 and 51 will be shifted slightly more relative to one another, during focusing adjustment of the normal-angle lens, than was the case when the wide-angle lens was connected with the camera. As the cam is rotated in focusing, therefore, it will not only shift the parallax slide 34, but will also shift the masks 50 and 51 to change the position and size of the image area to provide the proper correction in size and position of the image area to conform to the adjusted focal length of the normal angle lens.

When a telescopic lens is being connected to the camera through the bayonet lock coupling a different amount of movement will be imparted to the gear 82, than in the case of the normal angle lens mount, because of the different angular position of the pin 127 of the telescopic lens mount (Fig. 5) about the axis of the lens mount. In the case of the telescopic lens mount, for instance, the roller 77 may be moved up onto the portion 98 of the cam 80 to the position shown in Fig. 9 so that the guide surface 88 of hook member 70 rocks the guide 60 to a different position and causes masks 50 and 51 to provide a different size of image area for the zero position of adjustment of the telescopic lens. Also, since cam surface 88 is differently inclined to the diagonal slots 54, 55, 54', 55', a different component of movement will be imparted to masks 50 and 51 as lever 40 is rocked by cam 46. This will impart a different component of movement to the masks 50 and 51 as cam 46 is rotated in focusing the telescopic objective lens mount from that imparted by cam 46 to the masks during focusing of the normal angle lens mount. The cam 46 will move the long arm of the lever 40 upwardly and at the same time cause the composite viewfinder frame, formed by masks 50 and 51 and parallax slide 34, to move toward the lens axis, that is toward the axis of opening 25. This movement of the masks together with the movement of parallax slide 34 produced by cam 46 and lever 40 will provide not only the proper correction for parallax but will also provide the proper change of the size of the image area as the telescopic objective lens mount is focused. The composite image frame will be narrowed as the field of vision is changed by focusing the objective lens mount from infinity to a closer distance.

In the parallax mechanism of the present invention, the correction for parallax is tied in with the correction for field of view and adjusted during focusing by a cam that is coupled to the objective focusing mount. The component of correction for field of view is determined during attachment of a particular lens mount to the camera.

The sleeve 104 of each objective mount has a skirt portion 105 (Fig. 7) which has an arcuate slot 135 therein. Pivotally mounted by means of a pin 136 (Fig. 1) in a recess in the front wall 23 of the camera casing is a detent 137 (Figs. 1 and 6). This detent is pressed forwardly by a leaf spring 138 which is interposed between the detent and the front face of the casing. When an objective focusing mount is being coupled to the camera by the bayonet lock connection the skirt 105 of the objective focusing mount rides over the finger 139 of the detent depressing the detent. The objective can be rotated in the bayonet slot connection until one of the bounding walls of the slot 135 comes into engagement with a stop lug 140 (Fig. 1) that is integral with the peripheral rib 112 of collar 111. Immediately after the skirt 105 has passed over the finger 139 of the spring detent 137, the finger 139 snaps back into position to lock the objective focusing mount against rotation in one direction, while the stop lug 140 locks it against rotation in the other direction. The bayonet lock holds it to the camera casing.

To remove the objective focusing mount from the camera housing spring finger 139 is depressed and the objective focusing mount is rotated to align the lugs 110 of the mount with the spaces between the lugs 125 of the camera casing. Then the objective mount is withdrawn axially.

A stop 175 is secured in the casing to limit the rotary movement of the cam 46 by engagement with a stop surface on the cam. Cam 46 is shown in different positions in Figs. 9, 10 and 12, such as it assumes in different adjusted focusing positions of an objective focusing mount which is connected to the cam. Fig. 12 is one extreme position of the cam rotation.

The cam 46 not only controls the parallax mechanism, but also the deflecting system of the rangefinder of the camera. It operates this deflecting system through a pair of levers 145 and 146 (Fig. 2) which are adjustably connected by studs 147 and 148, respectively, with levers 149 and 150, respectively. These levers are pivotally mounted in the front wall 23 of the camera casing on pins 151 and 152, respectively. They have toothed segments 153 and 154, respectively, integral therewith. The toothed segments engage coaxial segmental gears, of which one is shown at 155, that are formed integral with rings, of which one is shown at 157, which are rotatable on one another and which carry the two axially-aligned circular optical wedges of the deflecting system of the rangefinder. One of these optical wedges is shown at 159. Coil springs 161 and 162 serve to take up the backlash in the gearing and to hold the levers 145 and 146 in engagement with the cam 46. These springs engage at one end, respectively, with lugs 163 and 164, respectively, that are integral with the respective lens carrying rings. At their other ends the two springs engage, respectively, lugs 165 and 166 that are fixed to the camera casing. The levers 145 and 146 are adjustable on the arms 149 and 150, respectively. To this end, the levers are slotted as denoted at 167 and 168, respectively, and have downturned ends 169 and 170, respectively, that engage in slots 171 and 172, respectively, formed in the arms 149 and 150, respectively. For a more detailed description of the deflecting system of the camera reference may be had to my copending application Serial No. 291,441, filed June 3, 1952.

As already stated, the windows through which an object may be viewed in the rangefinder or denoted are 21 and 22, respectively. Window 21 is circular and registers with the optical wedges of the deflecting system. Window 22 is rectangular and registers with the parallax mechanism and the eyepiece 24.

The rangefinder, as such, forms no part of the present invention; and may be of any conventional or suitable construction. That shown comprises a prism 180 (Fig. 3) having two angular surfaces 181 and 182 at opposite ends that are parallel. This prism is made so small and so thin that only the angle necessary for the reflected rangefinder image is covered by the 45° surface at its right hand end. This makes it possible for the lens system to come closer to the optical prism in order to cover a viewfinder angle for wide angle lenses. A compensation prism 183 is cemented to the end 182 of the prism 180. This acts really as a window pane in front of the eyepiece 24. The half mirror is secured to the small end 182 of the prism 180 by the prism 183.

Between the front window 22 and the eyepiece 24 there is mounted a lens 186 that is adjustable axially; and there is a second lens 187 that is mounted on a lever 188 to be swung into position between lens 186 and eyepiece 24. A lever 190 moves the lenses 192 through pins 191. Lever 188 is connected by pin 193 with the forked end of a lever 194. Levers 190 and 194 are operated by a cam, which is driven from the gear 82. The rangefinder need not further be described here. For further details thereof reference may be had to my copending above-mentioned application Serial No. 381,231, filed November 1, 1952. The present application is confined to the parallax mechanism including the mechanism for changing the field of view.

While the invention has been described in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic camera adapted to be provided selectively with any one of a number of interchangeable objective focusing mounts for photographic objectives of different focal lengths, and having a casing, a viewfinder mounted on said casing, an apertured frame movably mounted in said casing, a second apertured frame movably mounted in said casing and comprising two parts which are movable relative to one another to vary the size and position of the image appearing in said viewfinder, means connecting said two parts to the first-named frame to move said two parts relative to one another on movement of said first-named frame, a pivotable member also connected to said two parts of the second frame to move said two parts relative to one another on pivotal movement of said pivotable member, a rotary cam mounted in said casing and adapted to be connected to each of said objective focusing mounts, when a mount is attached to the camera, to be rotated on focusing adjustment of the mount, means connecting said cam to the first frame to move said first frame on rotation of said cam, means connecting said cam to said pivotal member to pivot said member on rotation of said cam, a follower secured to said pivotal member, a movable control member having a control surface for controlling the amount of movement of said pivotal member on rotation of said cam, means urging said follower into engagement with said control surface, said follower, when engaged with said control surface, being adapted to travel along said control surface in the pivotal movement of said pivotal member, and a second rotary cam mounted in said casing and operatively connected to said control member to vary the position of said control surface thereby to control the component of movement imparted to said pivotal member as said follower travels along said control surface, said second cam being adapted to be rotated by an objective focusing mount an amount determined by the focusing characteristic of the objective focusing mount during attachment of the mount to the camera.

2. A photographic camera having a casing, a viewfinder mounted in said casing, means for detachably securing to said casing any one of a number of adjustable focusing mounts for photographic objectives of different focal lengths, a pair of registering frames for framing the image appearing in said viewfinder, a third frame, said frames having registering rectangular framing openings therein and each being mounted in said casing for movement in a direction diagonal of said openings, means connecting said third frame to the other two frames to move said other two frames relative to one another on movement of said third frame to vary the size and position of the image appearing in the viewfinder, actuating means disposed to be connected to each focusing mount when the focusing mount is attached to the casing for moving said third frame on focusing adjustment of the mount, control means for controlling the component of movement imparted to said third frame on focusing adjustment of the mount attached to said casing, and means actuated by the focusing mount for adjusting said control means to a position in accordance with the focusing characteristic of the focusing mount being attached to the casing on attachment to the casing of a focusing mount, to thereby control the movement imparted to said third frame in accordance with the focusing characteristic of the attached focusing mount.

3. A photographic camera having a casing, a viewfinder mounted in said casing, means for detachably securing to said casing any one of a number of adjustable focusing mounts for photographic objectives of different focal lengths, a pair of registering frames for framing the image appearing in said viewfinder, a third frame, said frames having registering rectangular framing openings therein and each being mounted in said casing for movement in a direction diagonal of said openings, means connecting said third frame to the other two frames to move said other two frames relative to one another on movement of said third frame to vary the size and position of the image appearing in the viewfinder, actuating means disposed to be connected to each focusing mount when the focusing mount is attached to the casing for moving said third frame on focusing adjustment of the mount, a movable control member having a straight guide surface, means disposed to be actuated by the focusing mount on attachment of a focusing mount to said casing for positioning said control member so that its guide surface extends at an angle to the direction of movement of said frames in accordance with the focusing characteristic of the focusing mount being attached to said casing, a follower engaging said guide surface, and means operatively connecting said follower to said actuating means to impart a component of the movement of said actuating means to said third frame and thereby to said other two frames in accordance with the focusing characteristic of the focusing mount attached to the casing.

4. A photographic camera having a casing, a viewfinder mounted in said casing, means for detachably securing to said casing any one of a number of adjustable focusing mounts for photographic objectives of different focal lengths, a pair of registering frames for framing the image appearing in said viewfinder, a third frame, said frames having registering, generally rectangular framing openings therein and each being mounted in said casing for movement in a direction diagonal of said openings, means connecting said third frame to the other two frames to move said other two frames relative to one another on movement of said third frame to vary the size and position of the image appearing in the viewfinder, actuating means disposed to be connected to each focusing mount when the focusing mount is attached to the casing for moving said third frame on focusing adjustment of said focusing mount, a rockable member pivotally connected to the two other frames to move said two other frames relative to one another on movement of said rockable member, a control member having a straight guide surface, means actuated by the focusing mount for automatically positioning said control member upon attachment of a focusing mount to said casing so that its guide surface is inclined at an angle to the direction of movement of said frames in accordance with the focusing characteristic of the focusing mount being attached to said casing, and means connecting said control member to said rockable member whereby to impart a component of movement to said rockable member and thereby to said two other frames on focusing adjustment of the focusing mount.

5. A photographic camera having a casing, a viewfinder mounted in said casing, means for detachably securing to said casing any one of a number of adjustable focusing mounts for photographic objectives of different focal lengths, a pair of registering frames for framing the image appearing in said viewfinder, a third frame, said frames having registering, generally rectangular framing openings therein and each being mounted in said casing for movement in a direction diagonal of said openings, means connecting said third frame to the other two frames to move said other two frames relative to one another on movement of said third frame to vary the size and position of the image appearing in the viewfinder, a rockable member pivotally connected to said other two frames to move said two frames relative to one another on movement of said rockable member, a rotary cam mounted in said casing and disposed to be connected to each of said focusing mounts, when a mount is attached to said casing, to be rotated on focusing adjustment of the mount, actuating means connecting said cam to the third frame and to said rockable member to move said third frame and said rockable member on rotation of said cam, a movable control member having a straight guide surface, a second rotary cam mounted in said casing and operatively connected to said control member to move said control member to incline its guide surface to the direction of movement of said frames, said second cam being adapted to be rotated by the focusing mount by an amount corresponding to the focusing characteristic of the focusing mount being attached to said casing during attachment of a focusing mount to the casing, and a follower connecting said rockable member to said guide surface, whereby a component of movement of said actuating means will be imparted to said rockable member and thereby to said other two frames during focusing adjustment of the attached focusing mount in accordance with the focusing characteristic of said focusing mount.

6. A photographic camera having a casing, a viewfinder mounted in said casing, means for detachably securing to said casing any one of a number of adjustable focusing mounts for photographic objectives of different focal lengths, a pair of registering frames for framing the image appearing in said viewfinder, a third frame, said frames having registering, generally rectangular framing openings therein and each being mounted in said casing for movement in a direction diagonal of said openings, means connecting said third frame to the other two frames to move said other two frames relative to one another on movement of said third frame to vary the size and position of the image appearing in the viewfinder, a rockable member pivotally connected to said other two frames to move said two frames relative to one another on movement of said rockable member, a rotary cam mounted in said casing and disposed to be connected to each of said focusing mounts, when a mount is attached to said casing, to be rotated on focusing adjustment of the mount, actuating means connecting said cam to the third frame and to said rockable member to move said third frame and said rockable member on rotation of said cam, a movable control member having a straight guide surface, a second rotary cam mounted in said casing and operatively connected to said control member to move said control member to incline its guide surface to the direction of movement of said frames, said second cam being adapted to be rotated by the focusing mount by an amount corresponding to the focusing characteristic of the focusing mount being attached to said casing during attachment of a focusing mount to the casing, and a follower connecting said rockable member to said guide surface, whereby a component of movement of said actuating means will be imparted to said rockable member and thereby to said other two frames during focusing adjustment of the attached focusing mount in accordance with the focusing characteristic of said focusing mount, said two cams being coaxial with each focusing mount when the mount is attached to the casing.

References Cited in the file of this patent

UNITED STATES PATENTS

| | | |
|---|---|---|
| 2,157,547 | Leitz | May 9, 1939 |
| 2,157,548 | Leitz | May 9, 1939 |
| 2,187,246 | Nerwin | Jan. 16, 1940 |